US009912817B2

(12) United States Patent
Javaregowda et al.

(10) Patent No.: US 9,912,817 B2
(45) Date of Patent: Mar. 6, 2018

(54) PRESENCE ENABLED CALL CENTER

(71) Applicant: Verizon Patent and Licensing Inc., Arlington, VA (US)

(72) Inventors: Gowtham Javaregowda, Waltham, MA (US); Rafael A. Gaviria Velez, Medford, MA (US); Rezwanul Azim, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 13/901,450

(22) Filed: May 23, 2013

(65) Prior Publication Data

US 2014/0348321 A1 Nov. 27, 2014

(51) Int. Cl.
*H04M 3/00* (2006.01)
*H04M 3/523* (2006.01)
*H04M 3/51* (2006.01)
*H04M 5/00* (2006.01)
*H04L 12/66* (2006.01)

(52) U.S. Cl.
CPC ....... *H04M 3/5238* (2013.01); *H04M 3/5175* (2013.01); *H04M 2203/252* (2013.01); *H04M 2207/185* (2013.01)

(58) Field of Classification Search
CPC .. H04M 3/5232; H04M 3/5233; H04M 3/523; H04M 3/51; H04M 3/5238; H04M 3/5166; H04M 3/42365; H04M 3/5183; H04M 3/42042; G06Q 10/02; G06Q 20/322; G06Q 10/063114; G06Q 30/016
USPC ..... 709/203; 379/201.07, 201.1, 265.1, 266; 370/352, 353, 354, 355, 356, 357
See application file for complete search history.

(56) References Cited

U.S. PATENT DOCUMENTS

| | | | |
|---|---|---|---|
| 6,389,028 B1* | 5/2002 | Bondarenko et al. | 370/401 |
| 6,850,615 B1* | 2/2005 | Patel et al. | 379/266.06 |
| 8,638,925 B1* | 1/2014 | Billman | 379/265.12 |
| 2003/0108187 A1* | 6/2003 | Brown et al. | 379/266.03 |
| 2003/0217099 A1* | 11/2003 | Bobde et al. | 709/202 |
| 2003/0233537 A1* | 12/2003 | Wohlgemuth et al. | 713/151 |
| 2004/0121814 A1* | 6/2004 | Creamer et al. | 455/563 |
| 2005/0008141 A1* | 1/2005 | Kortum et al. | 379/266.06 |
| 2005/0152522 A1* | 7/2005 | Kumhyr | 379/201.04 |
| 2005/0187781 A1* | 8/2005 | Christensen | 705/1 |
| 2007/0265859 A1* | 11/2007 | Jachner | 705/1 |

(Continued)

OTHER PUBLICATIONS

Various Authors; RCS VoLTE Interoperability Event 2012; White Paper; Sep. 24, 2012 through Oct. 12, 2012; pp. 1-49; http://www.etsi.org/WebSite/document/Technologies/RCS_VoLTE_WhitePaper_11_14_2012.pdf.

*Primary Examiner* — Ahmad F Matar
*Assistant Examiner* — Kharye Pope

(57) ABSTRACT

Techniques described herein may use presence information to enhance the user experience when contacting entities such as call centers. In one implementation, a method may include receiving presence information relating to a state of a voice line. The presence information may include a wait time associated with the voice line, the wait time corresponding to an estimated time that a caller to the voice line will wait before reaching a human operator. The method may also include providing, by the one or more devices and to a user device that includes the voice line in a contact list, the presence information for display as part of the contact list.

20 Claims, 11 Drawing Sheets

(56) References Cited

U.S. PATENT DOCUMENTS

| | | | |
|---|---|---|---|
| 2008/0205625 A1* | 8/2008 | Mandalia et al. | 379/265.02 |
| 2009/0049168 A1* | 2/2009 | Galvin et al. | 709/224 |
| 2009/0112782 A1* | 4/2009 | Cross et al. | 706/45 |
| 2009/0252318 A1* | 10/2009 | Smith et al. | 379/265.1 |
| 2010/0070866 A1* | 3/2010 | Tung et al. | 715/733 |
| 2010/0189250 A1* | 7/2010 | Williams et al. | 379/266.01 |
| 2010/0257453 A1* | 10/2010 | Jachner | 715/738 |
| 2011/0019812 A1* | 1/2011 | Sankaranarayanan | 379/266.01 |
| 2011/0281551 A1* | 11/2011 | Gonzalez et al. | 455/406 |
| 2011/0286592 A1* | 11/2011 | Nimmagadda | 379/266.06 |
| 2012/0196578 A1* | 8/2012 | Williams et al. | 455/414.1 |
| 2012/0288075 A1* | 11/2012 | Williams et al. | 379/93.17 |
| 2012/0323997 A1* | 12/2012 | Mezhibovsky et al. | 709/204 |
| 2013/0054684 A1* | 2/2013 | Brazier et al. | 709/203 |
| 2013/0243180 A1* | 9/2013 | Williams et al. | 379/266.01 |
| 2013/0244632 A1* | 9/2013 | Spence et al. | 455/415 |

\* cited by examiner

PRESENCE ENABLED CALL CENTER

BACKGROUND

The Long Term Evolution (LTE) standard is a standard for wireless communication of high-speed data for mobile devices and data terminals. LTE is based on the GSM/EDGE (Global System for Mobile Communications/Enhanced Data rates for GSM Evolution) and UMTS/HSPA (Universal Mobile Telecommunications System/High Speed Packet Access) network technologies. Relative to GSM/EDGE and UMTS/HSPA, LTE may increase the capacity and speed of the wireless network based on improvements to the radio interface and improvements to the core network.

The LTE standard is based on packet-switched IP networking and does not have inherent support for circuit-switched voice calls. The Voice Over LTE (VoLTE) standard is one approach that may be used to provide voice calls in a network based on LTE.

Presence, as used with respect to network communication, such as voice and messaging communications, may refer to a service that allows a user to be informed about the reachability, availability, and/or willingness to communicate of other users. In communication systems in which presence is enabled, user devices may update a presence server with status information associated with the user of the user device. The status information may include, for example, whether the user is online or not online, or whether the user is idle or busy. Other user devices may receive the status information and may, for example, display the status of a particular user next to a name or other contact information associated with the particular user. The availability of presence information may significantly enhance the utility of communication applications such as instant messaging.

DETAILED DESCRIPTION OF PREFERRED EMBODIMENTS

The following detailed description refers to the accompanying drawings. The same reference numbers in different drawings may identify the same or similar elements.

Techniques described herein may use presence information to enhance the user experience when contacting commercial entities such as call centers. The presence information may be displayed, for example, in an address list or a contact list on a user device. The presence information may include information that is useful to a caller attempting to communicate with a call center. For example, the presence information may indicate the approximate wait time before a call to the call center will be answered by an operator.

Figure 1:
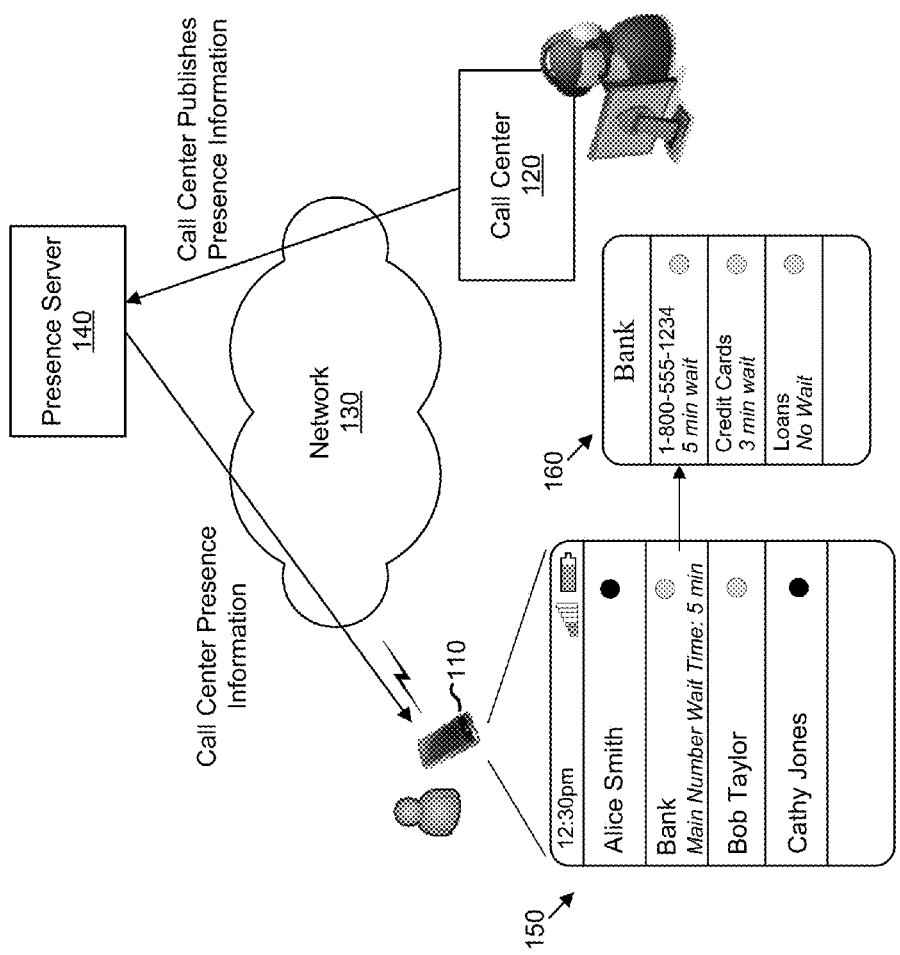
FIG. 1 is a diagram conceptually illustrating an example of an overview of concepts described herein.

FIG. 1 is a diagram conceptually illustrating an example of an overview of concepts described herein. As shown in FIG. 1, a user of a user device 110 may contact a call center 120, via a network 130. Call center 120 may be an entity, such as a corporation or other entity, that provides telephone support for the products or services of the entity. For example, a company, such as a finance provider, a manufacturer, or a restaurant, may implement a call center, which users of the company's products or services may call for support in the use of the products or services. A presence server 140 may maintain presence information relating to communication applications provided via network 130.

Consistent with aspects described herein, call center 120 may update presence server 140 with presence information relating to the operation of call center 120. The presence information may include wait times for various phone numbers and/or departments associated with call center 120. As is also shown in FIG. 1, user device 110 may provide an interface 150 (e.g., a graphical user interface) to a user of user device 110. Interface 150 may represent, for example, a contact or address list associated with the user of user device 110. Interface 150 may display the presence information from presence server 140. As illustrated, each contact in interface 150 may be associated with a circle that may be colored or shaded based on the status (as determined by the presence information) of the corresponding contact. For example, a green circle may indicate that the corresponding user is available and a red circle may indicate that the corresponding user is not available. One of the contacts illustrated in interface 150 ("Bank") may be a contact for a bank through which the user of user device 110 obtains banking services. The presence information for this type of contact may include additional information that relates to a call center operated by the bank. For example, as illustrated, the presence information states "Main Number Wait Time: 5 min." Advantageously, the user that desires to call the bank may thus make an informed decision as to when there is a good time to place the call. The wait time information may update, in real-time or near real-time, to reflect the current state of call center 120.

In some implementations, alternative or additional information may also be provided with the presence information. For example, as is also shown in FIG. 1, a second interface 160 may also be presented to the user. For example, the user may select "Bank" from interface 150 to cause the display of second interface 160, which may provide additional contact links (e.g., numbers) for the bank. The additional contact links may be provided as presence information that is received from presence server 140. As shown in FIG. 1, in addition to the main number for the bank (e.g., 1-800-555-1234), additional department contact links (e.g., for the credit card department of the bank and the loan department of the bank), along with presence information corresponding to the contact links (e.g., potentially including the wait time), may additionally be provided. For example, as shown, a credit card department of the bank may have a three-minute wait time and a loan department may not have a wait time (i.e., a caller may be immediately connected to a human operator).

In various implementations, other or additional information may be provided with the presence information. In one implementation, different wait times may be provided for different communication options. For example, in addition to initiating a voice call with call center 120, a user of user device 110 may participate in a chat session to obtain support. The chat session may also be associated with a wait time, which may be shown with the wait time for the voice call. In some implementations, a user may be able to set an alert, such as an alert that is triggered when the wait time falls below a certain threshold (e.g., alert the user, such as by vibrating user device 110, when the wait time for a particular contact is below 5 minutes).

Figure 2:
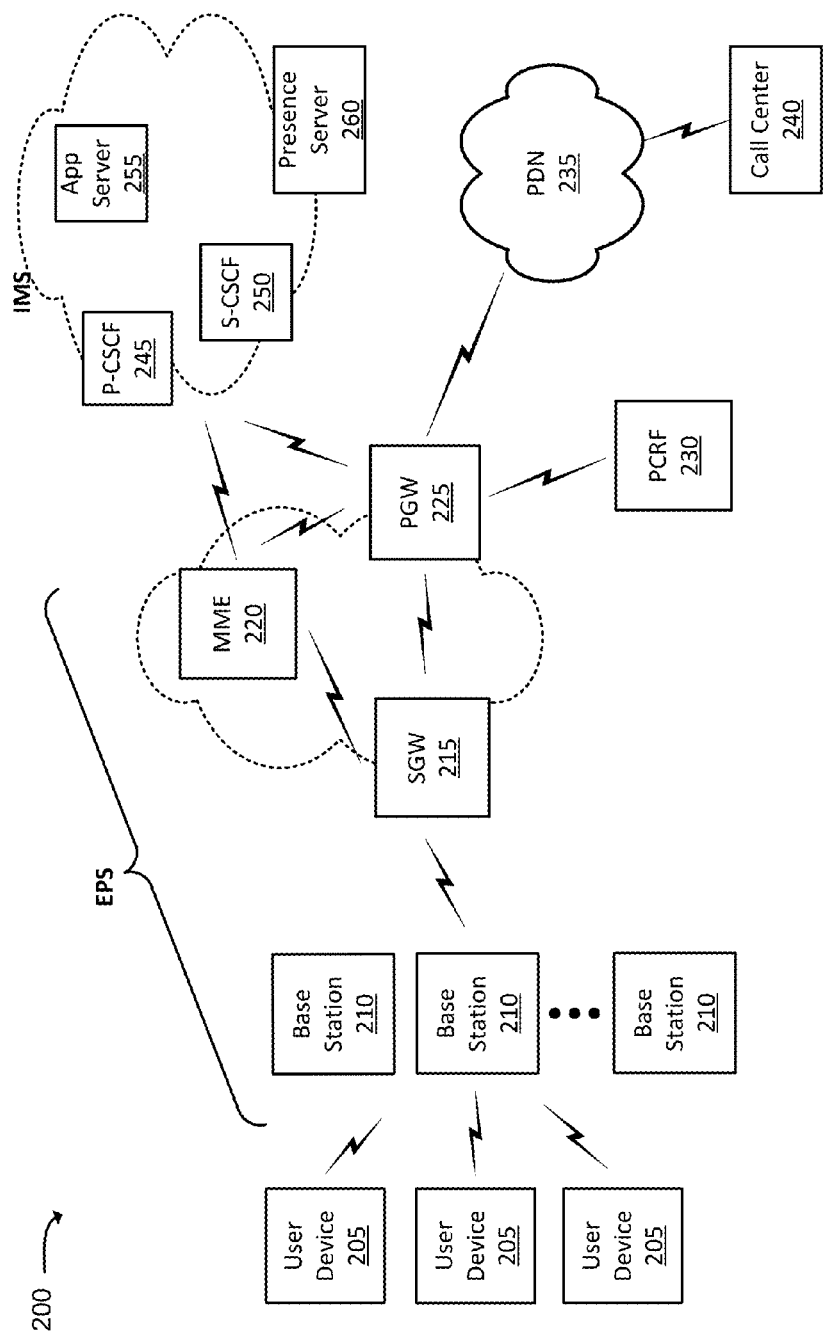
FIG. 2 is a diagram illustrating an example environment in which systems and/or methods described herein may be implemented.

FIG. 2 illustrates an example environment 200 in which systems and/or methods described herein may be implemented. Environment 200 may represent a wireless communication system, such as a cellular network, in which voice and data sessions may be established. In one implementation, environment 200 may include an evolved packet system (EPS) that includes a LTE network based on a third generation partnership project (3GPP) wireless communication standard. Additionally, environment 200 may include an IP Multimedia Subsystem (IMS) architecture for delivering IP multimedia services. Voice calls in environment 200 may be implemented using the Voice over LTE (VoLTE) standard to provide voice calls over LTE and IMS.

As shown in FIG. 2, environment 200 may include one or more user devices 205 and base stations 210. In an LTE environment, base stations 210 may take the form of eNodeBs and user devices 205 may be referred to as user equipment (UE). Environment 200 may further include serving gateway (SGW) 215, mobile management entity (MME) 220, packet data network gateway (PGW) 225, policy charging and rules function (PCRF) 230, a packet data network (PDN) 235, and a call center 240. The IMS portion of environment 200 may include proxy call session control function (P-CSCF) 245, serving call session control function (S-CSCF) 250, application (App) server 255, and presence server 260.

User devices 205 may include any computation and communication device, such as a wireless mobile communication device that is capable of communicating with base stations 210 over a radio (i.e., wireless) interface. For example, a user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device.

Base stations 210 may include one or more network devices that receive, process, and/or transmit traffic, such as calls, audio, video, text, and/or other data, destined for and/or received from user device 205. Base stations 210 and UEs 205 may communicate over radio interfaces to form a radio access network (RAN) for environment 200. Base stations 210 may receive traffic from and/or send traffic to PDN 235 via SGW 215 and PGW 225.

Base stations 210 may be physically located to provide cellular coverage to user devices 205, such that a user device 205 may seamlessly move out of range of one base station 210 and into range of another base station 210. Each base station 210 may simultaneously provide radio connectivity to multiple user devices 205.

SGW 215 may include one or more computation and communication devices that route and forward user data packets. SGW 215 may route and forward user packets and also act as a mobility anchor during inter-base station handoffs.

MME 220 may include one or more computation and communication devices that perform signaling in environment 200. MME 220 may, for example, be responsible for authenticating user devices 210, maintaining location information for user devices 210, and selecting a PGW 225 to service a particular user device 210. MME 220 may also operate to establish bearer channels associated with a session with user device 205, to hand off user device 205 from the EPS to another network, to hand off user device 205 from the other network to the EPS, and/or to perform other operations. MME 220 may perform policing operations on traffic destined for and/or received from user device 205.

PGW 225 may include one or more network devices, or other types of computation and communication devices, that gather, process, search, store, and/or provide information in a manner described herein. For instance, PGW 225 may aggregate traffic received from one or more SGWs 215, etc. and may send the aggregated traffic to PDN 235 and/or to another network. PGW 225 may also, or alternatively, receive traffic from PDN 235 and/or another network, and may send the traffic toward user device 205 via SGW 215 and/or base station 210. PGW 225 may also act as an interface for the IMS portion of environment 200.

PCRF 230 may include one or more server devices, or other types of devices, that aggregate information to and from the EPS network and/or other sources. PCRF 230 may receive information regarding policies and/or subscriptions from one or more sources, such as subscriber databases and/or from one or more users (such as, for example, an administrator associated with PCRF 230).

PDN 235 may include one or more wired and/or wireless networks. For example, PDN 235 may include an Internet Protocol ("IP") based PDN. PDN 235 may include, for example, a wide area network such as the Internet, or one or more other networks. User device 205 may connect, through PGW 225, to data servers, application servers, or to other servers/applications that are coupled to PDN 235.

Call center 240 may represent one or more computing devices, and/or other infrastructure, through which a company, or other entity, implements a call center. A call center may generally employ support operators that answer customer calls. In some implementations, call center 240, in addition to providing traditional customer support via voice calls, may provide customer support through additional communication applications, such as instant messaging, chat rooms, video calls, email, etc.

P-CSCF 245 may include one or more computation and communication devices that act as the initial point of contact for session signaling for an IMS-enabled VoLTE user device 205. P-CSCF 245 may behave as a session initiation protocol (SIP) proxy by forwarding SIP messages between a user device 205 and the IMS network. P-CSCF 245 may also enable binding of an IMS session with a bearer for applying policy rules and receiving notifications of bearer events.

S-CSCF 250 may include one or more computation and communication devices that process SIP signaling in environment 200. S-CSCF 250 may act as the central node of the signaling plane for IMS services. S-CSCF 250 may provide routing services and determine to which application servers particular SIP messages will be forwarded.

Application server 255 may include one or more computation and communication devices that provide support for VoLTE and Rich Communication Services (RCS) related services. In addition to support for VoLTE calls, application server 255 may, for instance provide support for an instant messaging, chat, video sharing, file transfer, and image transfer.

Presence server 260 may include one or more computation and communication devices that provide presence-related services. In some implementations, presence server 260 may be implemented as part of application server and/or may be implemented separately from the IMS network. In general, presence server 260 may receive presence information from user devices 205, call center 240, and/or from other devices. Presence server 260 may redistribute the received presence information to other devices, such as other user devices 205. The operation of presence server 260, according to some implementations, will be described in more detail below.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
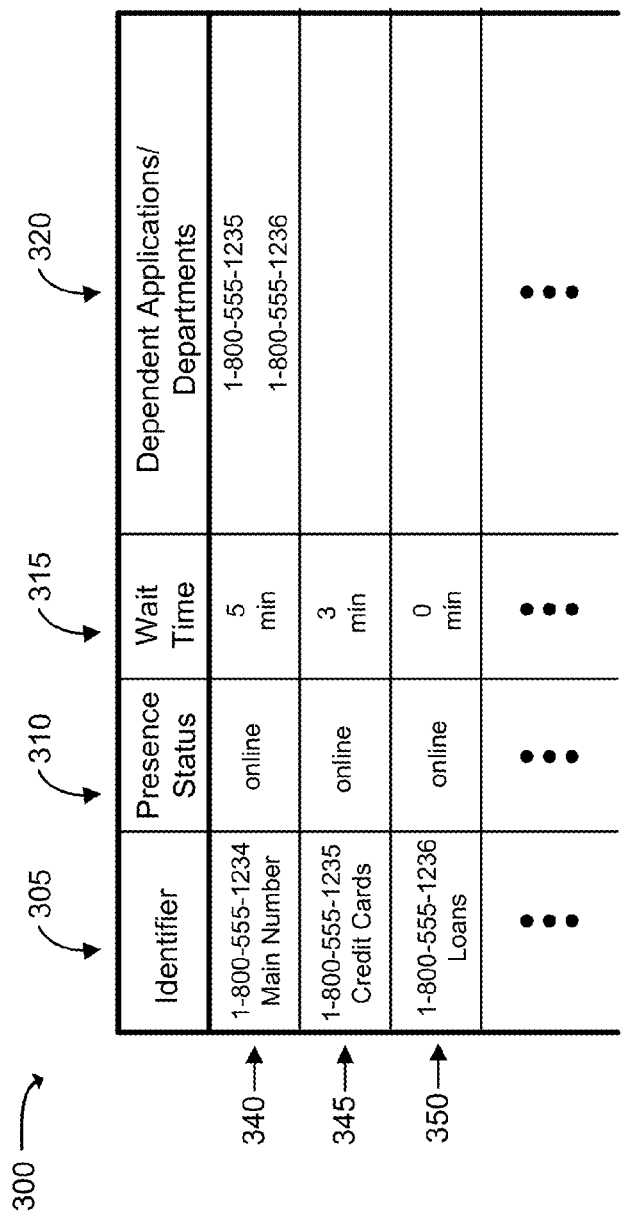
FIG. 3 is a diagram illustrating an example data structure that may be maintained by a presence server.

FIG. 3 is a diagram illustrating an example data structure 300, such as a data structure that may be maintained by presence server 260. Data structure 300 may generally be used to store presence information received from user devices 205, call center 240, and/or other devices. In one implementation, data structure 300 may be particularly used to store presence information relating to call center 240. Data structure 300 may be maintained separately from or integrated with a data structure(s) used to store standard presence information relating to user devices 205.

As illustrated, data structure 300 may include a number of fields, such as: identifier field 305, presence status field 310, wait time field 315, and dependent applications/departments 320. The fields shown for data structure 300 are examples. In alternative possible implementations, different, fewer, or additional fields may be implemented.

Identifier field 305 may include one or more values that identify a user device 205, a telephone number, or other entity. In one implementation, identifier field 305 may include telephone numbers, in which each telephone number may correspond to a different record in data structure 300. For example, a call center 240, for a company, may be associated with a number of departments, each of which may itself be associated with one or more telephone numbers. A call center 240 may allocate two telephone numbers for billing-related questions and allocate three telephone numbers for general product support-related questions. Each of these telephone numbers may be associated with a separate record in data structure 300. Alternatively, or additionally, multiple telephone numbers may be grouped. For example, the two telephone numbers allocated for billing-related questions may correspond to the same presence information, and may thus be linked and/or entered as a single record in data structure 300.

In some implementations, in addition to, or in lieu of, telephone numbers, other information may be used in identifier field 305. For example, customer support may be provided through online chat sessions, instant messaging applications, or other applications in which presence information may be useful. In this situation, identifier field 305 may include information identifying a chat application, instant messaging application, etc.

Presence status field 310 may include information indicating the status of the communication application corresponding to the record. In some implementations, a limited number of status values may be allowed for presence status field 310. For example, each record in data structure 310 may have a presence status that is one of: online, offline, idle, or busy. In other implementations, additional values for presence status field 310, such as user configurable values (e.g., "at lunch," "away from desk," "appointment," etc.), may also be allowed.

Wait time field 315 may include information relating to a wait time. For example, wait time field 315 may include an approximate wait time (e.g., expressed in seconds or minutes) corresponding to the communication application, such as a telephone number or line, associated with the record. The value in wait time field may correspond to an estimated time, after initiating a communication session with the communication application corresponding to the record, when a human operator may be available.

Dependent applications/departments field 320 may include information that identifies related communication applications. For example, for a particular telephone number, dependent applications/departments field 320 may include links to one or more other telephone numbers associated with the particular telephone number. As previously mentioned, in some implementations, a call center may include a number of departments or categories (e.g., a main contact department, a billing inquiry department, a technical support department, etc). Dependent applications/departments field 320 may include cross links to the various departments or help categories. For example, for the record corresponding to the main department, related applications field 320, may include links to the department for billing inquiries and to the department for technical support.

Three example records, corresponding to call center telephone numbers for an example bank, are particularly illustrated in FIG. 3. The first record, record 340, is for the telephone number that corresponds to a main contact telephone number for the bank. In this example, identifier field 305 includes the corresponding telephone number 1-800-555-1234 and a description ("Main Number"). Presence status field 310 includes the status "online," wait time field 315 includes a current wait time corresponding to the main number (e.g., 5 minutes), and related applications field 320 includes links (e.g., telephone numbers) of other call center telephone numbers associated with the bank (e.g., 1-800-555-1235 and 1-800-555-1236). Records 345 and 350 similarly include information relating to the other two numbers associated with the bank. As shown, record 345 includes the values: 1-800-555-1235 ("Credit Cards") for identifier field 305, "online" for presence status field 310, and three minutes for wait time field 315. Similarly, record 350 includes the values: 1-800-555-1236 ("Loans") for identifier field 305, "online" for presence status field 310, and zero minutes for wait time field 315.

Figure 4:
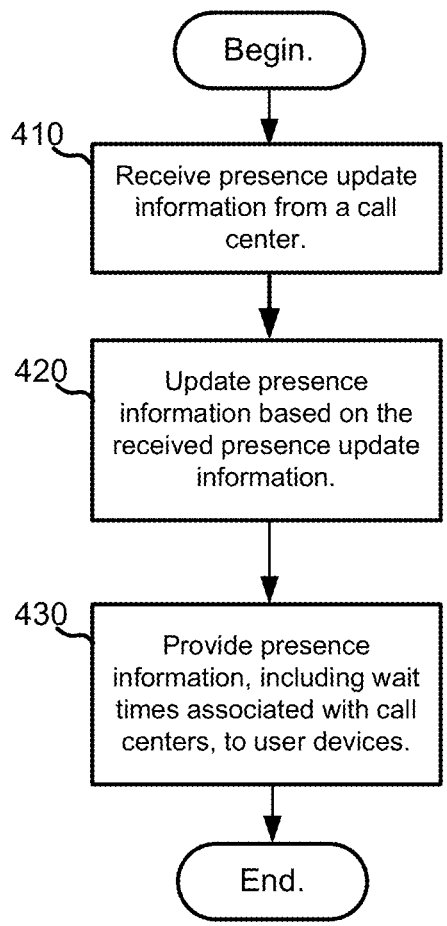
FIG. 4 is a flow chart illustrating an example process for providing call presence information for a call center.

FIG. 4 is a flow chart illustrating an example process 400 for providing call presence information for a call center. Process 400 may be implemented by, for example, presence server 260. In some implementations, process 400 may be implemented by other devices, such as application server 255 (e.g., when presence server 260 is implemented in application server 255).

Process 400 may include receiving presence update information from a call center (block 410). As mentioned, devices may update presence server 260 due to changes in a state of the devices that relates to presence. In one implementation, one or more computing devices in (or associated with) call center 240 may update the corresponding presence information that is maintained by presence server 260. For example, a message may be sent to presence server 260, to update presence status field 310, when a telephone number (or another service), associated with call center 240, comes online (e.g., a call center telephone number is now open to receive calls) or goes off-line (e.g., a call center telephone number may not be available outside of standard business hours). Additionally, whenever there is a wait time to speak with a human representative, presence server 260 may be regularly updated to reflect the current wait time. For instance, the wait time may be automatically calculated by one or more devices at call center 240, based on factors such as the number of queued customers, the number of available representatives, and the average time a representative spends with a customer. The calculated wait time may then be transmitted to presence server 260.

As previously mentioned, in some implementations, call center 240 may be associated with communication applications other than a voice (telephone) application. In some implementations, presence server 260 may also receive updates relating to the additional communication applications. For example, call center 240 may provide support via chat or instant messaging communication applications. A wait time may be associated with the availability of an operator to interact with the user via the chat or instant messaging applications. Presence server 260 may maintain these wait times in a manner similar to the storage of the wait times corresponding to the telephone call.

Process 400 may further include updating the presence information, maintained by presence server 260, based on the presence update information received from the call center (block 420). For instance, presence server 260, in response to receiving messages from call center 240 (or from other devices) may update data structure 300.

Process 400 may further include providing the presence information, including the wait times associated with call centers, to user devices (block 430). In one implementation, user devices 205, such as those in environment 200 that include a VoLTE application, may receive presence information from presence server 260. User devices 205 may, for example, register with presence server 260 to receive presence information relating to contacts in a contact list that is relevant to the user of user device 205. Presence server 260 may then transmit messages to user devices 205, to update the presence of the contacts in the contact list, whenever the presence information associated with one of the contacts changes. In this manner, when a user of device 205 views a contact list in order to place a telephone call to call center 240, the user may be apprised of the waiting time associated with the call center.

Figure 5:
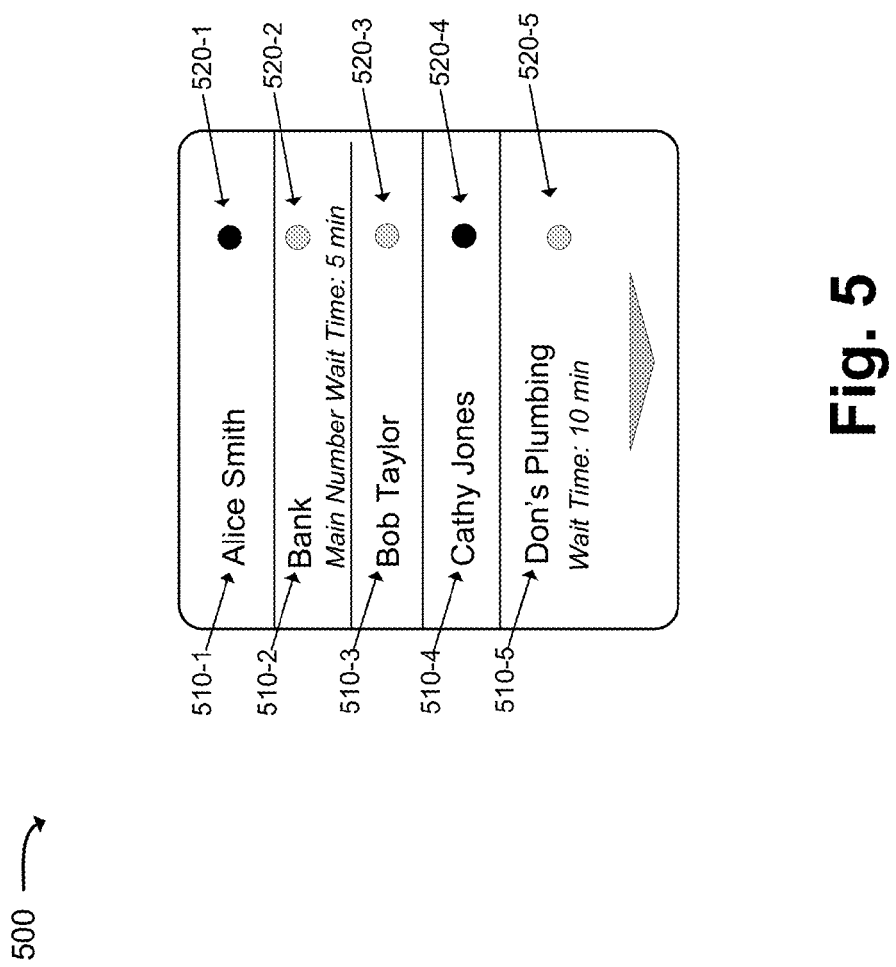
FIG. 5 is a diagram of an example interface that may be provided by a user device to present presence information.

FIG. 5 is a diagram of an example interface 500, such as a graphical user interface, that may be provided by a user device 205 to present received presence information. In this example, interface 500 may represent a graphical interface that displays the contacts of a user. In other implementations, the presence information may be presented through other applications or through other interfaces. In operation, a user viewing interface 500 may call a particular contact by, for example, selecting the contact that is to be called.

As illustrated, interface 500 displays a number of contacts 510-1 through 510-5. Each contact 510 may be associated with a name or label of the contact (e.g., Alice Smith, Bank, Bob Taylor, Cathy Jones, or Don's Plumbing) and a corresponding graphical indicator 520-1 through 520-5 (i.e., a circle in this example) that indicates the online/offline presence status of the contact. In this example, contacts 510-1 and 510-4 are illustrated as being associated with dark circles 520-1 and 520-4, respectively, which may indicate that the contact is off-line or otherwise not available. Contacts 510-2, 510-3, and 510-5 may be associated with lightly shaded circles, 510-2, 520-3, and 520-5, respectively, which may indicate that the contact is online (e.g., open or available).

Two of the contacts illustrated in interface 500, contact 510-2 (Bank) and contact 510-5 (Don's Plumbing), may be contacts that update presence server 260 to include presence information that relates to call wait time. In this example, assume that contact 510-2 (e.g., a bank) is associated with a call center that may employ a number of people and that that may answer multiple telephone contact numbers. As shown, the wait time associated with this contact may be five minutes. Contact 510-5 may be, for example, a relatively small plumbing business that uses an outsourced call center in which operators at the call center may handle calls relating to a number of different businesses. Wait time for this outsourced call center is illustrated as 10 minutes.

In some implementations, instead of showing both a wait time and a graphical indicator of connection status, the wait time may only be displayed and/or another graphical indicator may be displayed indicating the wait status. For example, a square or other symbol may be illustrated, in which a color of the square may represent an approximate wait time (e.g., green for no wait time, yellow for a moderate wait time, red for a long wait time, etc.).

Figure 6:
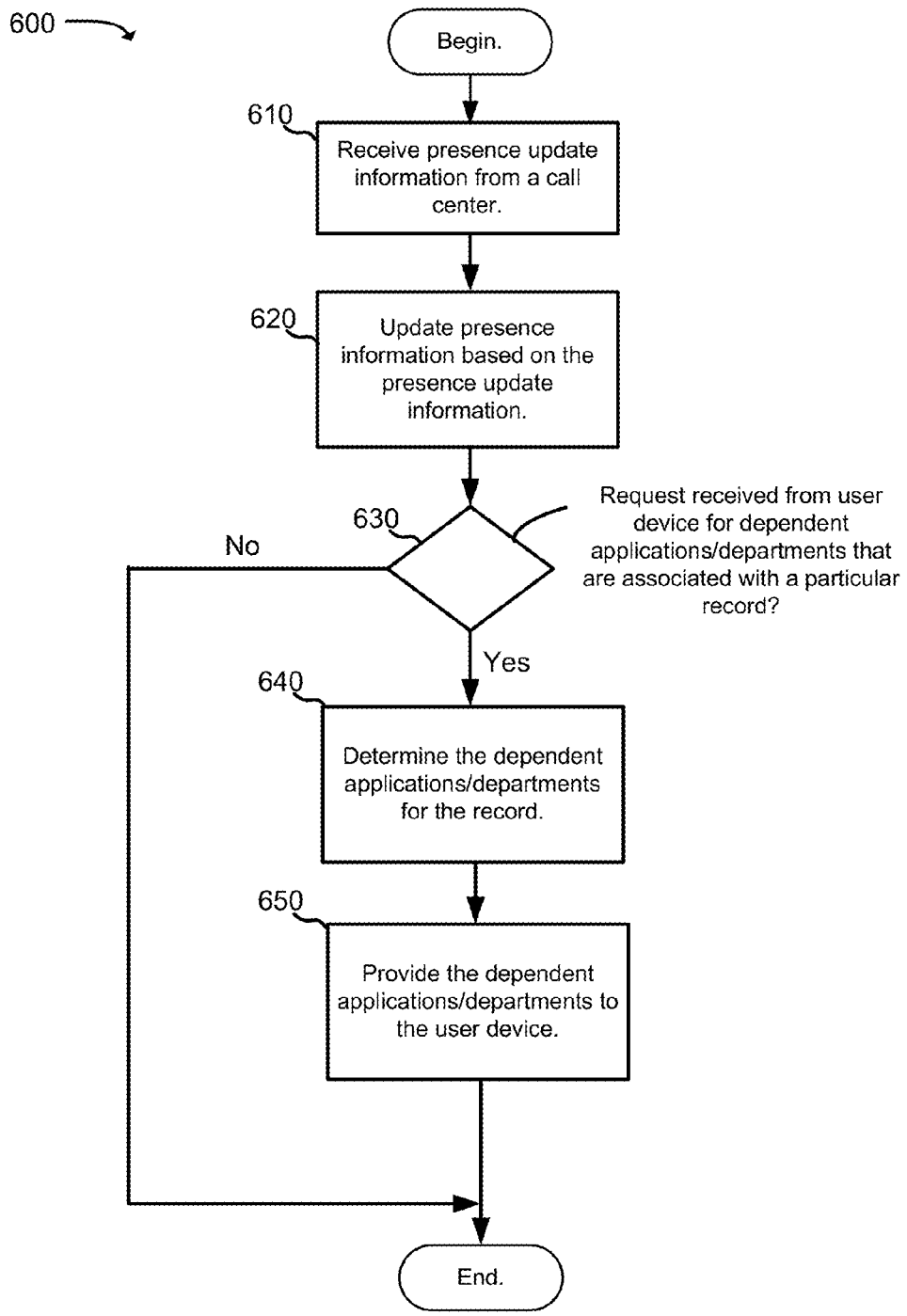
FIG. 6 is a flow chart illustrating an example of another process for providing call presence information for a call center.

FIG. 6 is a flow chart illustrating an example of another process 600 for providing call presence information for a call center. Process 600 may be implemented by, for example, presence server 260. Process 600 may be similar to process 400. However, in the implementation of process 600, related applications or departments, associated with a primary contact, may be automatically provided to a user device 205 and made available for viewing. Process 600 may be implemented in conjunction with or separately from process 400.

Process 600 may include receiving presence update information from a call center (block 610). As mentioned, devices may update presence server 260 due to changes in a state of the devices that relates to presence. In one implementation, one or more computing devices in (or associated with) call center 240 may update the presence information in presence server 260. As previously discussed with respect to process 400, the updates to presence server 260 may include updates relating to the presence status or the wait time.

Process 600 may further include updating the presence information, maintained by presence server 260, based on the presence update information received from the call center (block 620). For instance, presence server 260, in response to receiving messages from call center 240 (or from other devices) may update data structure 300.

Process 600 may further include receiving a request, from a user device, for the dependent applications/departments that are related to a particular record (block 630). For example, a user of a user device 205 may select a particular contact in the contact list, where the particular contact may be associated with one or more dependent applications/departments. Mobile device 205 may request, such as via a message sent to prison server 260, that presence server 260 return the dependent applications/departments that correspond to the record (e.g., in data structure 300) of the particular contact.

When a request is received for dependent applications/departments (block 630—YES), process 600 may include determining the dependent applications/departments for the record (block 640). The record may include dependent applications/departments in dependent applications/departments field 320 of data structure 300. Presence server 260 may determine the identifiers of the dependent applications/departments (e.g., determine the corresponding records in data structure 300) and then determine presence information corresponding to the identifiers.

Process 600 may further include providing the determined dependent applications/departments, to the requesting user device (block 650). The user device may present the dependent applications/departments to the user. In this manner, the contact list of a user can be dynamically augmented to include additional contacts that may be of interest to a user when contacting a call center.

Figure 7:
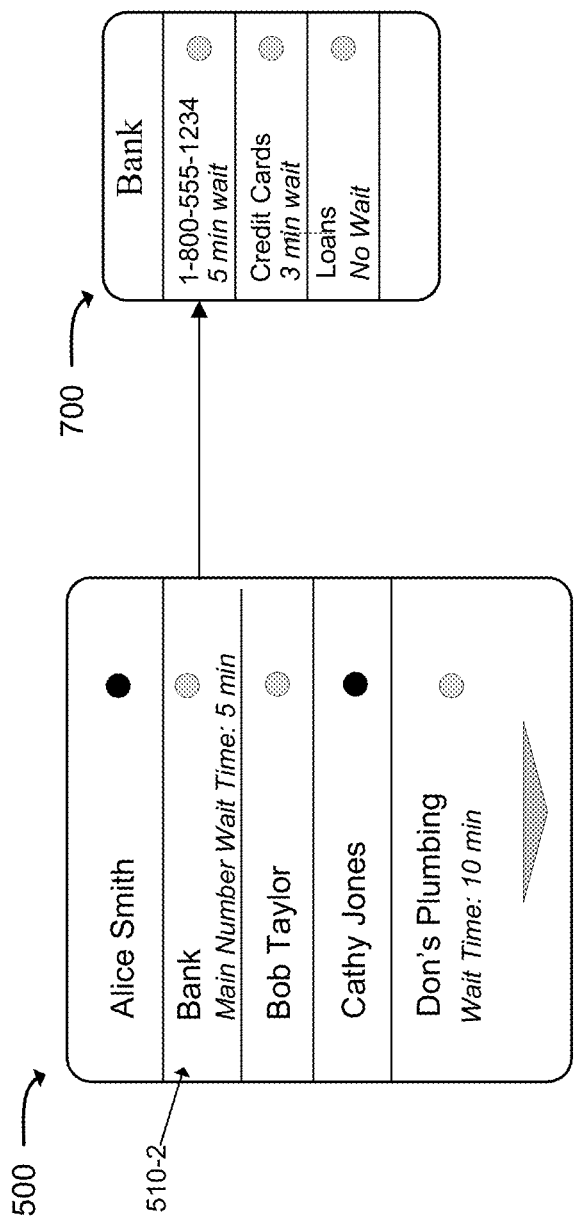
FIGS. 7 and 8 are diagrams of example interfaces that present presence information.

FIG. 7 is a diagram of example interfaces 500 and 700, such as a graphical user interfaces that may present presence information received via process 600. The presence information may include dependent applications/departments. The dependent applications/departments may have been dynamically obtained, by a user device 205, based on the operation of process 600.

As illustrated in FIG. 7, assume that a user, of user device 205, selects contact 510-2 of interface 500. This contact may be associated with dependent applications/departments. The selection of contact 510-2 may result in the presentation of interface 700, which includes the main contact (contact 510-2) and the dependent applications/departments that correspond to contact 510-2. In this example, as illustrated, two additional contacts are presented: one contact for a credit card department of the bank and one for a loans department of the bank. The user may then select any of these three contacts to initiate a telephone call with the corresponding department of the bank.

Figure 8:
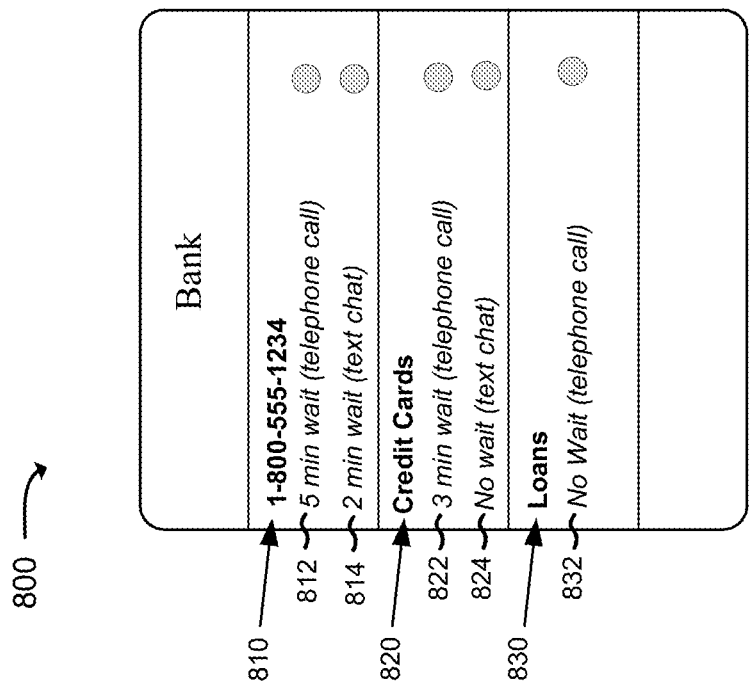

In some implementations, in additional to telephone contacts, other types of communication applications may be simultaneously presented to a user via a contact list. FIG. 8 is a diagram of an example interface 800, such as a graphical user interface, presenting additional communication applications in a contact list. Presence information for the additional communication applications may be provided by presence server 260, such as by providing dependent applications/departments to a user device via process 600 (FIG. 6).

Interface 800, as shown in FIG. 8, may be similar to interface 700. In interface 800, however, the illustrated departments may each potentially be associated with multiple communication applications. For example, as shown, department 810 (e.g., the bank's main contact department) may include a link 812 through which a user may place a telephone call (associated with a five minute wait time) to department 810. Additionally, a second link 814 may be associated with communication application through which users may use a chat application (i.e., communicate through a graphical window in which instant messages may be exchanged) with a call center operator. An estimated wait time to obtain an operator for the chat application is illustrated as two minutes. In one implementation, selection of link 812 or link 814 (e.g., via touch selection on a touch screen) by user of user device 205 may cause initiation of a telephone call or chat window, respectively.

As is further shown in FIG. 8, department 820 (e.g., a credit card department) may include a link 822 through which a user may place a telephone call (associated with a 3 minute wait time) to department 820. Additionally, link 824 may be associated with a chat application in which there is currently no wait time. Department 830 (e.g. a loan department) may include a link 832 to which a user may place a telephone call (for which there is currently no wait time).

Figure 9:
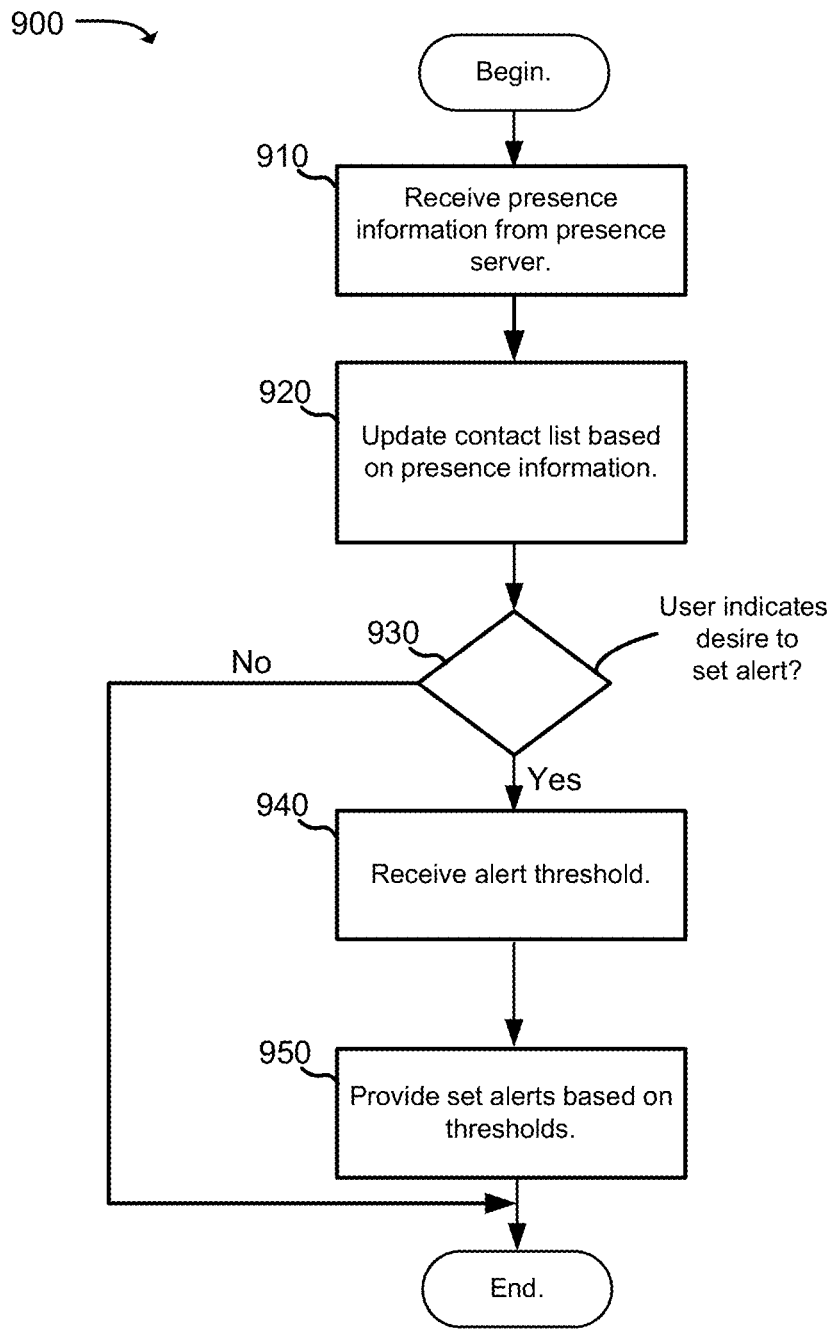
FIG. 9 is a flow chart illustrating an example of a process for operating a user device.

FIG. 9 is a flow chart illustrating an example of a process 900 in which a user may set alerts based on presence information. Process 900 may be implemented by, for example, a user device 205.

Process 900 may include receiving presence information from the presence server (block 910). In one implementation, a user device 205 may register with presence server 260 as part of initial attachment to an LTE or IMS network. Presence server 260 may thereafter transmit updates to user device 205 whenever there is a change in state, relating to presence, for a telephone number or other communication application that is relevant to user device 205.

Based on the received presence information, process 900 may further include updating contact lists, at user device 205 (block 920). In one implementation, the contact lists may particularly include an address/telephone number list associated with an application used to manage or initiate VoLTE or RCS services. Alternatively or additionally, the presence information may be used to update other applications or data structures that are implemented by user device 205.

In some implementations, user device 205 may provide the ability to set alerts relating to the received presence information. For example, the user may indicate a desire to set an alert (block 930). The alert may be based on, for example, a wait time for a particular call center telephone number falling below a particular level or the present status for the particular call center telephone number entering an "online" state. The user may indicate the desire to set the alert using a number of possible techniques, such as selecting a menu option on a touch sensitive display of user device 205.

When an indication of the user's desire to set the alert is received (block 930—YES), process 900 may further include prompting the user for a threshold value relating to the alert (block 940). As mentioned, for an alert based on wait time, user may enter a threshold value (e.g. two minute wait, no wait, etc.) indicating when the user would like to be alerted. For an alert based on other presence information, such as the online/offline status of a telephone number or department, the user may enter the target status (e.g., generate alert when the telephone number/department comes online).

Process 900 may further include providing the alerts based on the set thresholds (block 950). User device 205 may, for example, when an alert is triggered based on the presence information, provide an audible and/or visual signal to the user of user device 205. As one example, assume that a user indicates that the user would like to be alerted when the wait time for a particular call center number goes to zero (e.g., there is no wait time to speak with a representative of the call center). When the wait time for the particular call center is zero, the user may be alerted via an audio and/or visual alert (e.g., a sound may be played, an icon may be displayed in a notification area, etc.).

Figure 10:
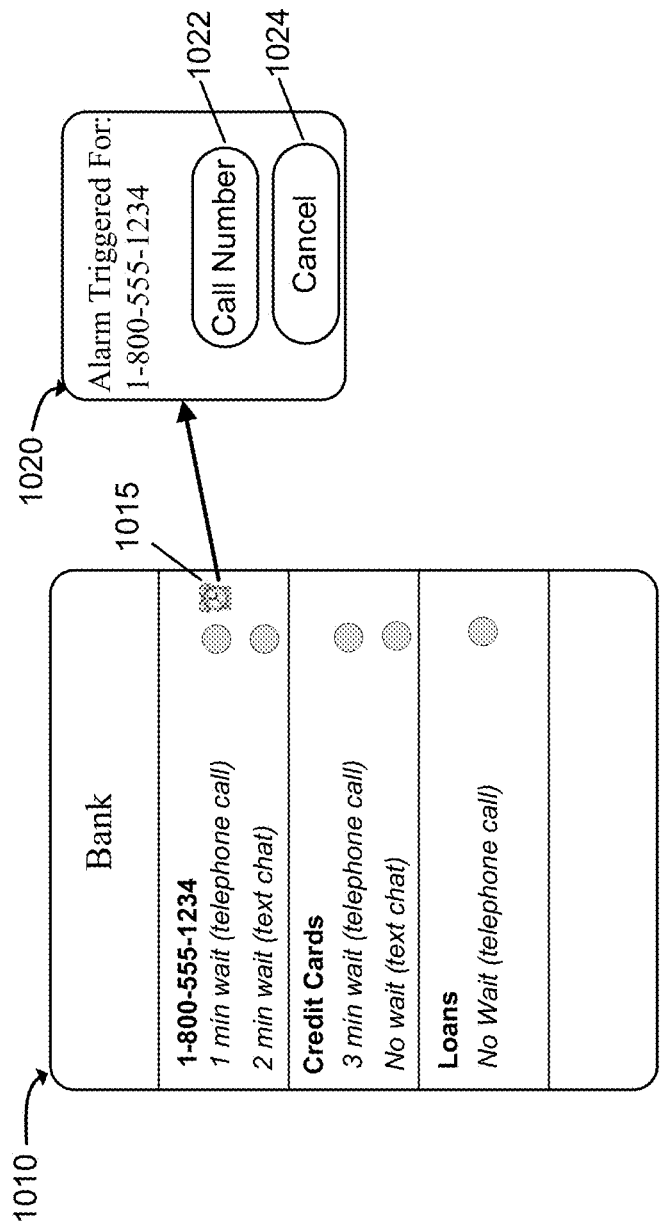
FIG. 10 is a diagram of example interfaces that may be presented to a user as part of the implementation of an alert.

FIG. 10 is a diagram of example interfaces that may be presented to a user as part of the implementation of an alert. As illustrated, interface 1010 may include an interface similar to interface 800 (FIG. 8). In addition, assume that a user has set an alert for the main telephone number for the call center of a bank. The alert may be visually indicated by an icon, such as icon 1015.

At some point, the alert may be triggered. For example, assume that the alert is set to trigger when the wait time drops to one minute or less. At this point, an interface, such as interface 1020, may be displayed to the user of user device 205. Interface 1020 may indicate that the alert was triggered ("Alert triggered for: 1-800-555-1234"). A graphical button, button 1022 ("Call Number"), may be provided to directly place the call to the corresponding number, and a second graphical button, button 1024 ("Cancel"), may be provided to dismiss interface 1020. As mentioned, in some implementations, an audio sound may also or alternatively be generated by user device 205 as part of the alert.

In some implementations, in addition to being able to set alerts, additional options may be provided to a user to interact with the call center. For example, a user may be able to request a callback from a call center. The call center may place the user's callback requests in a queue and may use presence information to apprise the user of the user's current position in the queue.

Figure 11:
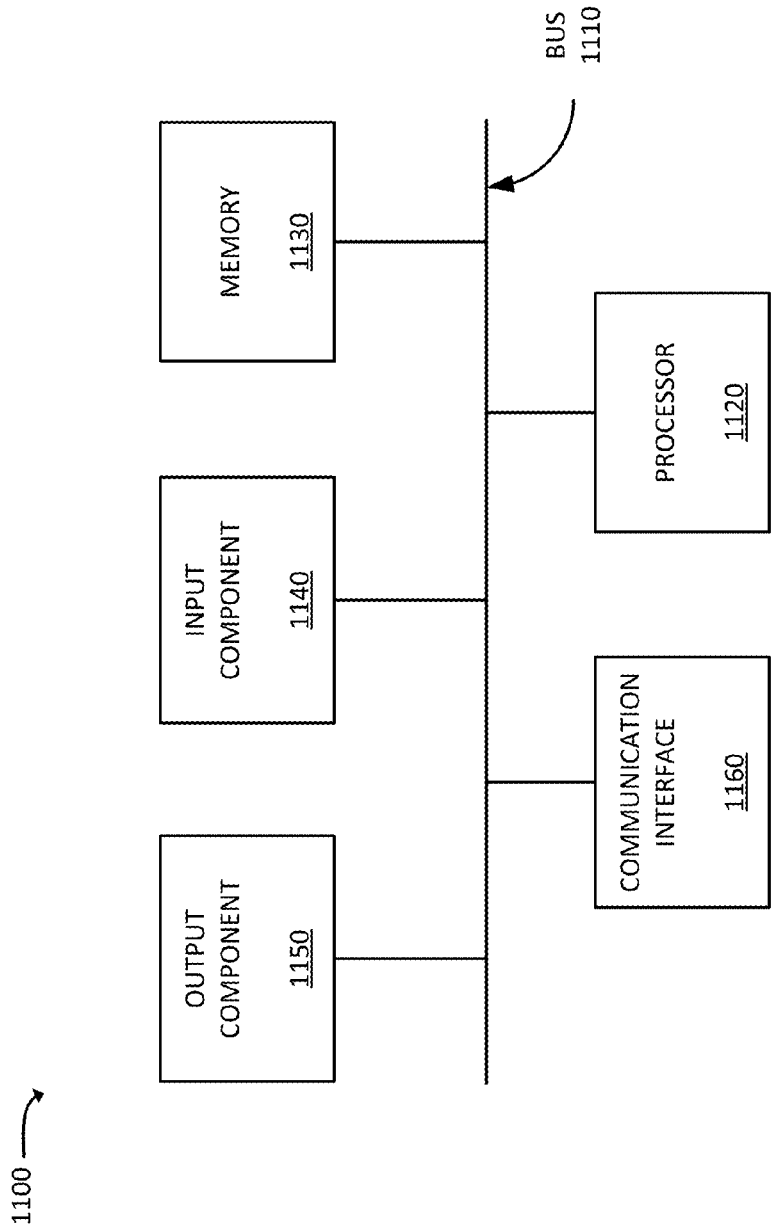
FIG. 11 is a diagram of example components of a device.

FIG. 11 is a diagram of example components of a device 1100. Each of the devices illustrated in FIGS. 1 and 2 may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIGS. 4, 6, and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
   receiving, by one or more devices that implement a presence server, presence information relating to a state of a voice line associated with a call center, the presence information including:
   a wait time associated with the voice line, the wait time corresponding to an estimated time that a caller to the voice line will wait before reaching a human operator; and
   providing, by the one or more devices and to a user device that displays a contact list that includes an entry for an entity associated with the call center, the presence information for display as part of the entry for the entity in the contact list, and for generating an audible or visual alert that is triggered when the wait time, associated with the voice line, decreases to a user configurable value, the presence information being provided independently of the user device communicating with the call center.

2. The method of claim 1, wherein the presence information is dynamically updated to reflect changing values of the wait time associated with the voice line.

3. The method of claim 1, wherein the presence information is received from the call center.

4. The method of claim 1, further comprising:
receiving additional presence information relating to a state of a communication application other than the voice line, the additional presence information including:
a wait time associated with the communication application, the wait time corresponding to an estimated time before the communication application is associated with an available human operator.

5. The method of claim 4, wherein the communication application includes an instant messaging chat session.

6. The method of claim 1, wherein the presence server includes a presence server in an IP Multimedia Subsystem (IMS) system associated with an architecture for delivering IP multimedia services in a Long Term Evolution (LTE) system.

7. The method of claim 1, wherein the voice line is associated with a call center, the method further comprising:
providing, to the user device, presence information associated with at least one additional voice line, the at least one additional voice line not being included in the contact list of the user device and the at least one additional voice line being associated with a dependent department of the entity associated with the call center.

8. The method of claim 7, wherein the providing of the presence information with the at least one additional voice line is performed in response to a request from the user device.

9. The method of claim 1, wherein the voice line corresponds to a voice over long term evolution (VoLTE) call.

10. A presence server device comprising:
a memory; and
at least one processor to execute instructions in the memory to:
receive presence information relating to a state of a voice line associated with a call center, the presence information including:
a wait time associated with the voice line, the wait time corresponding to an estimated time that a caller to the voice line will wait before reaching a human operator; and
provide, by the presence server and to a user device that displays a contact list that includes an entity associated with the call center, the presence information for display as part of the entry for the entity in the contact list and for generating an audible or visual alert that is triggered when the wait time, associated with the voice line, decreases to a user configurable value, the presence information being provided independently of the user device communicating with the call center.

11. The device of claim 10, wherein the presence information is dynamically updated to reflect changing values of the wait time associated with the voice line.

12. The device of claim 10, wherein the presence information is received from the call center.

13. The device of claim 10, wherein the at least one processor is further to execute instructions in the memory to:
receive additional presence information relating to a state of a communication application other than the voice line, the additional presence information including:
a wait time associated with the communication application, the wait time corresponding to an estimated time before the communication application is associated with an available human operator.

14. The device of claim 13, wherein the communication application includes an instant messaging chat session.

15. The device of claim 10, wherein the at least one processor is further to execute instructions in the memory to:
provide, to the user device, presence information associated with at least one additional voice line, the at least one additional voice line not being included in the contact list of the user device and the at least one additional voice line being associated with a dependent department of the entity associated with the call center.

16. A method comprising:
receiving, by a user device, presence information relating to a state of contacts in a contact list, the presence information including:
wait times associated with the contacts in the contact list, the wait times corresponding to an estimated time that a user of the user device will wait, when initiating a communication session with a particular contact in the contact list, before reaching a human operator;
displaying, by the user device, an indication of the wait times as part of display of the contacts in the contact list, the indication of the wait times being displayed independently of and before corresponding communication sessions have been initiated with the contacts in the contact list;
receiving, by the user device, a user selectable alert threshold value relating to when an alert, associated with a contact in the contact list, should be issued;
determining, by the user device and based on the wait times, that the alert should be issued when at least one of the wait times decreases to the user selectable alert threshold value; and
providing, by the user device and based on the determination that the alert should be issued, an audible or visual alert corresponding to the particular contact in the contact list.

17. The method of claim 16, further comprising:
receiving, by the user device, additional contacts from a presence server, the additional contacts including contacts that are not in the contact list and that are related to the particular contact in the contact list.

18. The method of claim 17, wherein the relation of the additional contacts to the particular contact includes a relation in which the additional contacts include contacts associated with a call center that is also associated with the particular contact.

19. The method of claim 16, wherein the communication session includes a voice over long term evolution (VoLTE) call or an instant messaging chat session.

20. The method of claim 16, wherein the presence information is dynamically updated to reflect changing values of the wait time associated with the communication session.

* * * * *